Dec. 8, 1931. C. H. DUFFY Re. 18,281

RADIO LOUD SPEAKER

Original Filed June 30, 1930

INVENTOR

Charles Hugh Duffy,

BY Robert H. Young

ATTORNEY

Reissued Dec. 8, 1931

Re. 18,281

UNITED STATES PATENT OFFICE

CHARLES HUGH DUFFY, OF MIAMI, FLORIDA

RADIO LOUD SPEAKER

Original No. 1,818,987, dated August 18, 1931, Serial No. 464,788, filed June 30, 1930. Application for reissue filed October 13, 1931. Serial No. 568,616.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

This invention relates to radio loud speakers and the like, but more particularly to a drive system therefor, and has for its object to incorporate improvements over my U. S. Patent No. 1,740,161, dated December 17, 1929, wherein two or more driving units are employed.

In radio and like loud speakers wherein the diaphragm is driven by a single unit, such unit can, by a plurality of field windings or by other known means, be caused to be pitched to a high resonance in order to accentuate the reproduction of the high frequencies and slight the value of the lows, or it may be pitched to a low resonance to accentuate the reproduction of the low frequencies and slight the value of the highs. Such a system however does not contemplate an accentuation of both the high and low frequencies at the same time, nor does it provide for the variations of simultaneous accentuations of both high and low frequencies.

In the present invention, I prefer to employ a plurality of adjacent diaphragm driving units, or pulsating current impulse responsive devices, preferably two, each of which has preferably three field windings. One of the windings being of a relatively low impedance or ohmage resistance in order to let through the high frequency pulsations and relatively restrict the lows. The other of the windings being of a relatively medium impedance or ohmage resistance so as to let through the high and low frequencies with equal facility and thus pitch the reproduction at medium values. The other of the windings being of a relatively high impedance or ohmage resistance so as to restrict the highs and let through the lows to pitch the reproduction to a low resonance.

In the example shown in the accompanying drawings, two such diaphragm driving units are illustrated.

By such an arrangement, and by the construction which will be presently described, the reproduced sound may be pitched and composited or blended to produce six different tonal changes, while by reason of the instrumentality provided for causing the driving units to deliver simultaneous but opposed pulsations to the vibratory diaphragm, or adjacent diaphragm, these six tonal changes may be increased to twelve different tonal changes; all of which instrumentalities will be first fully described and afterwards specifically pointed out in the appended claims.

Referring to the accompanying drawings.

Like numerals of reference indicate the same parts throughout the several figures, in which.

R represents the receiver, and 1 and 2 represent the wires through which the pulsating current is delivered therefrom.

Figure 1:
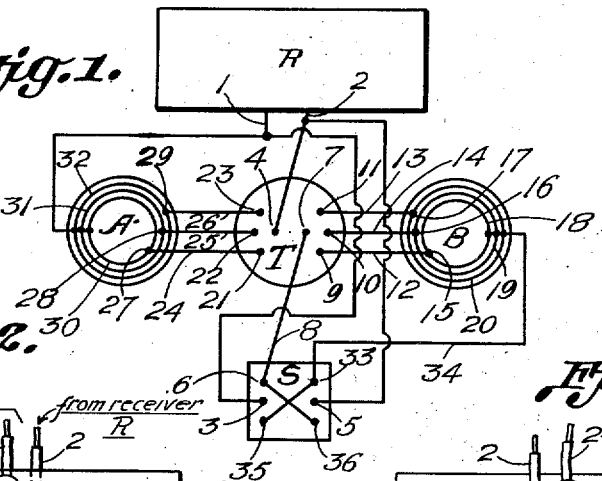
Figure 1 is a diagrammatic view of one example of the component parts of the system.

As shown in the example illustrated in Figure 1, the wire 1 passes to the three field windings of the diaphragm drive unit A, and also to one center pole 3 of the reversing switch S. The other wire 2 passes to a binding post 4 of the selective switch T, and also to the other of the central poles 5 of the reversing switch S.

Connecting a pole 6 of the reversing switch S with a binding post 7 of the selective switch T, is a wire 8. Three switch binding posts 9, 10 and 11, Figure 3 are connected by wires 12, 13 and 14 to the three taps 15, 16 and 17 of the three field windings 18, 19 and 20 of the drive unit B, while three switch binding posts 21, 22 and 23 are connected by wires 24, 25 and 26 to the three taps 27, 28 and 29 of the three field windings 30, 31 and 32 of the drive unit A.

Connecting the pole 33 of the reversing switch S with the three field windings 18, 19 and 20 of the drive unit B, is a wire 34. The poles 35 and 36 of the reversing switch S are connected to the poles 6 and 33 thereof by crossed wires as diagrammatically shown, or the reversal of the direction of flow of pulsating current from the receiver R to the drive unit B may be effected by any other known means.

Figure 2:
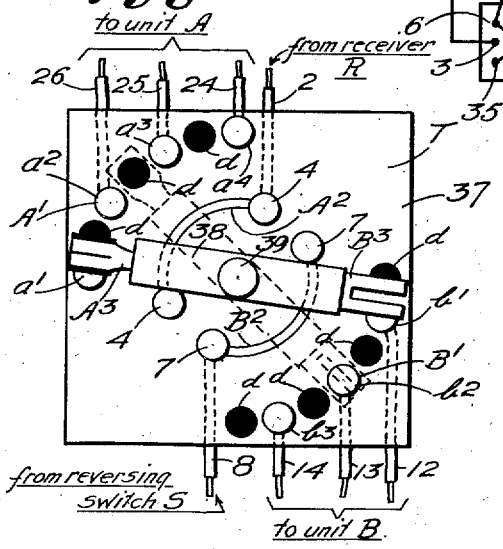
Figure 2 is a front elevation of the selective switch.
Figure 3:
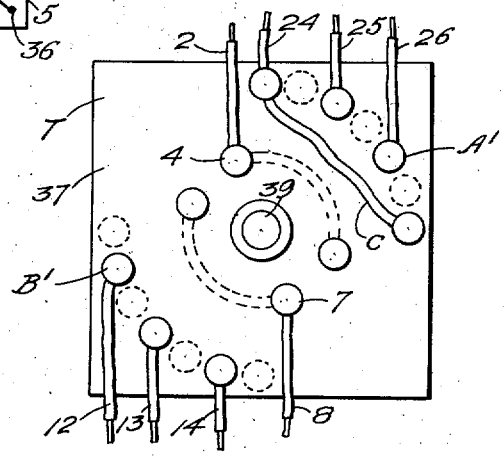
Figure 3 is a rear elevation of the same.
Figure 4:
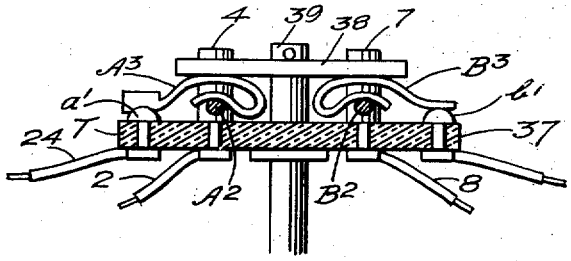
Figure 4 is a cross sectional view through the same.

Referring now to the selective switch T, it will be seen from Figures 2, 3 and 4 of the drawings that the same embodies an insulating base 37, and insulating arm 38 carried on a shaft 39 centrally mounted in the base 37.

Arcuately arranged on the base 37, are two series of switch contacts A′ and B′. Each of the contacts of these series have preferably semi-spherical heads standing above the plane of the base 37, and each series comprises live and dead contacts alternately arranged, the dead contacts being shown black. In the series A′ the first and last or end contacts are live, each alternate contact being dead, while in series B′, the first and last or end contacts are dead, each alternate contact being live. The result of this arrangement is that a live contact of one series is diametrically opposite to a dead contact of the other series, and a dead contact of one series is diametrically opposite to a live contact of the other series. The four live contacts of series A′ are indicated by the characters $a'$, $a^2$, $a^3$ and $a^4$, while the three live contacts of series B′ are indicated by the characters $b'$, $b^2$ and $b^3$. The dead contacts of both series are indicated by the letter $d$.

Arranged intermediate the series of contacts A′ and the central shaft 39 is an arcuate or segmental stationary contact $A^2$, common to the series A′, and supported at each end in two posts 4 which form stops for the insulated arm 38, one of which posts forms a binding post for the wire 2 from the receiver R.

Intermediate the series of contacts B′ and central shaft 39 is an arcuate or segmental stationary contact $B^2$ common to the series B′ and supported at each end in two posts 7, one of which forms a binding post for the wire 8 from the reversing switch S.

The insulated contact-carrying arm 38 extends over the two arcuate or segmental contacts $A^2$ and $B^2$ and carries at each end thereof a spring double contact or brush. One of these $A^3$ is formed, for instance, as shown in Figure 4, the outer end terminating in a V-shaped contact or brush to engage the series of contacts A′, while the inner end is curved as shown and engages the common arcuate or segmental contact $A^2$. The other of these spring double contacts $B^3$ is formed, for instance, as shown in Figure 4, the outer end being flat and bifurcated (Fig. 2) to engage the series of contacts B′, while the inner end is curved as shown and engages the common arcuate or segmental contact $B^2$.

Having thus described the construction, the operation of the selective switch is as follows:

From Figure 3 it will be seen that the two end live contacts of series A′ are connected together, by a wire C, and from Figure 2, it will be seen that the V-shaped end of the spring contact $A^3$ is in electrical contact with the live end contact and the adjacent dead contact of series A′, while it will be understood from Figure 4, the inner end of the spring contact $A^3$ is always in electrical contact with the common arcuate or segmental contact $A^2$.

It will be seen from Figure 2 that the flat bifurcated end of the spring contact $B^3$ is wide enough to make contact with two of the contacts of series B′, and when the V-shaped end of contact $A^3$ is in contact with two live and dead contacts of series A′, the flat bifurcated end of spring contact $B^3$ is in contact with two live and dead contacts of series B′, while the inner curved end of spring contact $B^3$ is always in contact with the common arcuate or segmental contact $B^2$ (Fig. 4).

The switch being in position shown in Figure 2, the circuit from the receiver R passes to the drive unit A or pulsating current impulse responsive device through the selective switch T. This circuit is through wire 2 from receiver R to binding post 4 of the common arcuate or segmental contact $A^2$ and through the spring double contact $A^3$ to the switch contact $a'$ and through the wire 24 to the tap 27 of the low impedance field winding 30, which for instance may be of the order of 500 ohms. This winding pitches the drive unit A or impulse responsive device to a high resonance.

The circuit from the receiver R to the drive unit B passes through the wire 2 to the central pole 5 of the reversing switch S and to the binding post 33 of the reversing switch and through the wire 34 to the low impedance field winding 18 and through the wire 12 to the switch contact $b'$ of series B′; then through the spring double contact $B^3$ to the common arcuate or segmental contact $B^2$ and its binding post 7 through the wire 8 to the pole 6 of the reversing switch S. From the center pole 3 of the reversing switch S the circuit leads to the receiver R.

It will thus be seen that when the selective switch T is in position shown in Fig. 2, the low impedance windings of both drive units A and B are in circuit, which pitches both drive units or impulse responsive devices to a high resonance. It will also be seen that when the central poles 3 and 5 of the reversing switch S are connected to the poles 6 and 33 as in the circuit just described, the direction of flow of the pulsating current from the receiver R to the drive unit B is the reverse of that to the drive unit A. This causes positive impulses of drive unit A to be simultaneously accompanied by negative impulses of drive unit B. When the units A and B are connected at different points to a common diaphragm or to two adjacent diaphragms and in such a circuit, positive sound producing impulses are imparted by one portion of the single diaphragm, or by one diaphragm simultaneously with negative sound producing impulses imparted by another portion of the diaphragm or by another adjacent diaphragm from the same side of the diaphragm or diaphragms. The acoustical effect of this diaphragm action is that diaphragm and unnatural resonance is eliminated, the audibility of the low frequencies is impaired and the moderate and high frequencies are sharpened. When the action of one of the drive units is thus reversed, the effect is particularly favorable to the reproduction of the speaking voice, where the elimination of fuzzy resonance is desirable and sharpness and definition of the spoken words essential.

Referring again to Figure 2, it will be seen that as the arm 38 is moved clockwise, the V-shaped end of the spring contact $A^3$ breaks contact with the live switch contact $a'$ and rides up over the adjacent dead contact $d$. At the same time the bifurcated flat end of the spring contact $B^3$ leaves the end-most dead contact $d$ of the series $B'$ and wipes over the adjacent live contact $b'$. During these movements, the circuit to the drive unit A is broken, but the circuit to the drive unit B is maintained. The movement is therefore accompanied by no break nor interruption in the reproduction, as the entire output from the receiver R is passing to the drive unit B during the brief period. The clockwise movement being continued, the said V-shaped end of the spring contact $A^3$ drops down between the dead contact $d$, over which it has ridden, and the next adjacent live contact $a^2$ and establishes electrical contact with the live contact $a^2$. At the same time, the bifurcated flat end of the spring contact $B^3$ passes over the live contact $b'$ and on to the adjacent dead contact $d$ without breaking contact with said live contact $b'$. The drive unit B is thus maintained in its circuit, but a new circuit has been established for the drive unit A. The switch contact $a^2$ of series $A'$ is connected to the highest impedance field winding 32 of the drive unit A, by the wire 26 and this field winding is thus brought into the circuit. This pitches the drive unit A to its lowest resonance, while the drive unit B is still pitched to its highest resonance. The acoustical effect of this combination is that the fullest range of which the system is capable is obtained. The high frequencies are reproduced at their maximum by the drive unit B, while the low frequencies are reproduced at their fullest values by the drive unit A. An audible click is produced at the instant the V-shaped end of the spring contact $A^3$ drops down into contact with the live switch contact $a^2$ and the tension of the spring contact $A^3$ is sufficient to maintain both contacts $A^2$ and $B^2$ against casual movement in either direction.

When it is desired to change to any of the other combinations to modify the resonance of the reproduction, as for instance to pitch the same to the lowest resonance of which the system is capable, the arm 38 is again moved clockwise. This causes the V-shaped end of the spring contact $A^3$ to ride up on the live switch contact $a^2$ and maintain its contact therewith. At the same time the bifurcated flat end of spring contact $B^3$ breaks contact with the live switch contact $b'$ and passes over the adjacent dead contact $d$. These movements result in maintaining the drive unit A in circuit and breaking the circuit of the drive unit B, so that during this brief interval, the reproduction is unbroken and uninterrupted. Continued movement of the arm 38 clockwise causes the V-shaped end of the spring contact $A^3$ to drop down between the live switch contact $a^2$, with which it is in contact, and the adjacent dead contact $d$, thus maintaining contact with said live switch contact $a^2$ and maintaining the highest impedance field winding 32 of the drive unit A in circuit. At the same time the bifurcated flat end of spring contact $B^3$ passes into electrical contact with the adjacent live switch contact $b^2$ and connects the highest impedance field winding 20 of the drive unit B in the circuit through the wire 13. This changes the pitch of the resonance of the drive unit B from the highest to the lowest and as the corresponding highest impedance field winding 32 of the drive unit A is maintained in circuit as just described, both drive units A and B are pitched to their lowest resonance.

Further selective movement of the arm 38, maintains the drive unit B in circuit to continue the reproduction without break or interruption and after momentarily breaking the circuit of drive unit A, establishes another circuit by bringing the intermediate field winding 31 of drive unit A into circuit through the switch contact $a^3$ and the wire 25. This movement maintains the pitch of the drive unit B at its lowest resonance and changes the pitch of the drive unit A to a medium resonance.

Further movement of the arm 38 maintains the drive unit B in circuit to continue the reproduction without break or interruption, but establishes another circuit for drive unit A in which the low impedance field winding of the drive unit A is brought in circuit. This pitches the drive unit A to a high resonance and maintains the drive unit B at a medium resonance.

It will be seen from Figure 3 illustrating a rear view of the selective switch shown in Figure 2 that the two endmost live contacts of series $A'$, which as will appear from Figure 2 are contacts $a'$ and $a^4$, are electrically connected together. Consequently when the movable contact $A^3$ is in contact with either of these two endmost live contacts $a'$ and $a^4$, the same circuit to the drive unit A is closed through the wires 2 and 24, as will be apparent from Figure 3. For instance from Figure 2, it will be seen that while contacts $B^2$ and $b'$ are connected as shown, contact $A^2$ and $a'$ are connected, but as contacts $a'$ and $a^4$ are electrically connected (Figure 3), the circuit is the same as if the movable contact $A^3$ were in physical contact with the contact $A^4$.

It will be noted that in the operation of the selective switch T, to change from one point to another the circuits of the drive units A and B are alternately broken, and that at no time is there any break in the reproduction, because while the switch is changing one of the drive units from one pitch resonance to another, the circuit of the other of the drive units is maintained unbroken.

In the example shown in which the drive units are each provided with three field windings of different impedances, six combinations are obtainable to effect six different tonal changes in the reproduction by the selective switch T. As each of these combinations can be again changed by the reversing switch S, a total of twelve different tonal changes is available in the example shown.

As it is necessary that the impulse responsive devices be sufficiently close together so that the sound reproduced at one of them is composited or blended with the sound reproduced at the other impulse responsive device, it may be said that the impulse responsive devices are "adjacent" when that result is accomplished.

While I have disclosed one example of the system, the pitch of the resonance of the two drive units or impulse responsive devices may be changed in any known manner other than by different or tapped field windings, as for instance by fixed or variable condensers, and the units or impulse responsive devices selectively brought into various combinations as by a selective switch such for instance as herein described.

Having thus described one example of the invention, what I claim as new and desire to secure by Letters Patent of the United States is:

1. A drive system for radio loud speaker diaphragms and the like including two adjacent diaphragm actuating units, each of which includes a plurality of field windings of different impedances, a source of pulsating electric current, an electrical circuit, a selective switch including two series of switch contacts, one series of said contacts for each actuating unit and for electrical connection with the plurality of field windings of each actuating unit, and a reversing switch in electrical circuit with one of the actuating units and disposed electrically between the source of pulsating current and the selective switch, whereby the direction of flow of pulsating current through the field windings of one unit may be reversed with respect to the direction of flow of the pulsating current through the field windings of the other of the actuating units.

2. A drive system for radio loud speaker diaphragms and the like, including two adjacent diaphragm actuating units, each of which includes a plurality of field windings of different impedances, a source of pulsating electric current, an electrical circuit, a selective switch including two series of switch contacts for electrical connection with the plurality of field windings of the actuating units, whereby any one of the field windings of one actuating unit may be connected in circuit with any one of the field windings of the other actuating unit, and a reversing switch in electrical circuit with one of the actuating units, whereby the direction of flow of pulsating current through the field windings of one unit may be reversed with respect to the direction of flow of pulsating current through the field windings of the other of the actuating units.

3. A drive system for radio loud speaker diaphragms and the like, including two adjacent diaphragm actuating units, each of which includes a plurality of field windings of different impedances, a source of pulsating electric current, an electric circuit, a selective switch including two series of switch contacts for electrical connection with the plurality of field windings of the actuating units, whereby any one of the field windings of one actuating unit may be connected in circuit with any one of the field windings of the other actuating unit.

4. A drive system for radio loud speaker diaphragms and the like, including two adjacent diaphragm actuating units, each of which includes a plurality of field windings of different impedances, an electrical circuit, a selective switch including two series of switch contacts for electrical connection with the plurality of field windings of the actuating units, whereby any one of the field windings of one actuating unit may be connected in circuit with any one of the field windings of the other actuating unit.

5. A drive system for radio loud speakers and the like, including two adjacent diaphragm actuating units, an electrical circuit, means for imparting to each of the two units a plurality of different pitch resonances, and a selective switch for selectively connecting the two units in the circuit to impart to each of them the same pitch resonance, or to impart to one of them a certain pitch resonance and to the other of them a different pitch resonance.

6. A drive system for radio loud speakers and the like including two adjacent diaphragm actuating units, an electrical circuit, means for imparting to each of the two units a plurality of different pitch resonances, and means for selectively connecting the two units in the circuit to impart to each of them the same or different pitch resonances.

7. A drive system for radio loud speakers and the like, including two adjacent pulsating current impulse responsive devices, an electrical circuit, means for imparting to each of the two impulse responsive devices a plurality of different pitch resonances, and means for selectively connecting the two impulse responsive devices to impart to each of them the same or different pitch resonance.

8. A drive system for radio loud speaker diaphragms and the like, including two adjacent diaphragm actuating units, each of which includes a plurality of field windings of different impedances, an electrical circuit, a selective switch including two series of switch contacts, one series of said contacts for each actuating unit and for electrical connection with the plurality of field windings of each actuating unit, switch contacts movable over both series of switch contacts to selectively engage a contact of each series of switch contacts to bring any one of the field windings of one unit and any one of the field windings of the other unit in the electrical circuit, and a reversing switch in electrical circuit with one of the actuating units, whereby the direction of flow of the current through the selected field winding of one unit may be reversed with respect to the direction of flow of the current through the selected field winding of the other of the actuating units.

9. A drive system for radio loud speaker diaphragms and the like, including two adjacent diaphragm actuating units, each of which includes a plurality of field windings of different impedances, an electrical circuit, and a selective switch including two series of switch contacts, one series for each actuating unit and for electrical connection with the plurality of field windings of each actuating unit, switch contacts movable over both series of switch contacts to selectively engage a contact of each series of switch contacts to bring any one of the field windings of one unit and any one of the field windings of the other unit in the electrical circuit.

10. A drive system for radio loud speaker diaphragms and the like, including two adjacent diaphragm actuating units, each of which includes a plurality of field windings of different impedances, an electrical circuit, and a selective switch including two series of switch contacts, one series for each actuating unit, the contacts of each series being opposite to one another, a switch contact movable over both series of switch contacts to selectively engage opposite switch contacts of each series to bring any one of the field windings of both units in the electrical circuit, and a reversing switch in circuit with one of the units to reverse the direction of flow of current to one unit with respect to the other unit.

11. A drive system for radio loud speaker diaphragms and the like including two adjacent diaphragm actuating units, each of which includes a plurality of field windings of different impedances, an electrical circuit, and a selective switch including two series of switch contacts, one series for each actuating unit, the contacts of each series being opposite to one another, switch contacts movable over both series of switch contacts to selectively engage opposite switch contacts of each series to bring any one of the field windings of both units in the electrical circuit.

12. A drive system for radio loud speaker diaphragms and the like, including two adjacent diaphragm actuating units, an electrical circuit, the units including a plurality of field windings of different impedances, a selective switch including a series of switch contacts for each unit, each series of contacts including a live contact for electrical connection with each of the plurality of field windings, and also including in alternate arrangement with the live contacts a plurality of dead contacts, the live contacts of one series being diametrically opposite the dead contacts of the other series, an arm having contacts movable over each series of contacts, the movable contacts being of a width to engage a live and a dead contact of each series to selectively connect any field winding of one unit and any field winding of the other unit in the circuit, the herein recited arrangement of switch contacts insuring the holding of a field winding of one unit in the circuit when the connection is broken to a field winding of the other unit as the movable contacts are selectively moved, to the end that the different field windings of the two units may be selectively connected and disconnected in the circuit without interruption or break in the sound reproduction, and means for reversing the direction of flow of the current to one of the units with respect to the direction of flow of the current to the other of the units.

13. A drive system for radio loud speaker diaphragms and the like, including two adjacent diaphragm actuating units, an electrical circuit, the units including a plurality of field windings of different impedances, a selective switch including a series of switch contacts for each unit, each series of contacts including a live contact for electrical connection with each of the different field windings and also including in alternate arrangement with the live contacts a plurality of dead contacts, the live contacts of one series being diametrically opposite the dead contacts of the other series, an arm having contacts movable over each series of contacts, the movable contacts being of a width to engage a live and a dead contact of each series to selectively connect any field winding of one unit and any field winding of the other unit in the circuit, the herein recited arrangement of switch contacts insuring the holding of a field winding of one unit in the circuit when connection is broken to a field winding of the other unit, as the movable contacts are selectively moved, to the end that the different field windings of the two units may be selectively connected and disconnected in the circuit without interruption or break in the sound reproduction.

14. A drive system for radio loud speaker diaphragms and the like, including two adjacent diaphragm actuating units, an electrical circuit, each unit including a plurality of field windings of different impedances, a selective switch including a series of switch contacts for each unit, each series of contacts including an upstanding live contact for electrical connection with each of the different field windings, and also including in alternate arrangement with the live contacts, a plurality of upstanding dead contacts, an arm having contacts movable over each series of contacts, the movable contacts being of a width to engage a live and a dead contact of each series to selectively connect any field winding of one unit and any field winding of the other unit in the circuit, one of the movable contacts being V-shaped to drop in between a live and a dead contact of one series to prevent casual movement of the movable contacts.

15. A drive system for radio loud speaker diaphragms and the like including two adjacent diaphragm actuating units, an electrical circuit, each unit including a plurality of field windings of different impedances, a selective switch in electrical connection with the different field windings of both units, the selective switch including means for selectively connecting any field winding of one unit and any field winding of the other unit in the circuit without simultaneously breaking the circuit through the field windings of both units, and means for reversing the direction of flow of current to one unit with respect to the direction of flow of current to the other unit.

16. A drive system for radio loud speaker diaphragms and the like including two adjacent diaphragm actuating units, an electrical circuit, each unit including a plurality of field windings of different impedances, a selective switch in electrical connection with the different field windings of both units, the selective switch including means for selectively connecting any field winding of one unit and any field winding of the other unit in the circuit without simultaneously breaking the circuit through the field windings of both units.

17. A drive system for radio loud speakers and the like including two adjacent diaphragm actuating units, and including means for imparting to each of the two units a plurality of different pitch resonances, an electrical circuit and a selective switch including means for electrically connecting in the circuit the means for imparting different pitch resonances to one of the units and for connecting in the circuit the means for imparting different pitch resonances to the other of the two units whereby the sound reproduced by each of the two units may have the same pitch resonance, or the sound reproduced by one unit may have a high pitch resonance and the sound jointly reproduced by the other unit may have a low pitch resonance.

18. A drive system for radio loud speaker diaphragms and the like including two adjacent diaphragm actuating units and means for imparting to each of the units a plurality of different pitch resonances, an electrical circuit, a selective switch including two series of switch contacts, the contacts of each series being opposite to one another, a switch contact movable over both series of switch contacts to selectively engage opposite switch contacts of each series to connect in the circuit the means for imparting different pitch resonances to one of the units and to connect in the circuit the means for imparting different pitch resonances to the other of the units, and means for reversing the direction of flow of current to one unit with respect to the direction of flow of current to the other unit.

19. A drive system for radio loud speaker diaphragms and the like, including two adjacent diaphragm actuating units and means for imparting to each of the units a plurality of different pitch resonances, an electrical circuit, a selective switch including two series of switch contacts, the contacts of each series being opposite to one another, and switch contacts movable over both series of contacts to selectively engage opposite switch contacts of each series to connect in the circuit the means for imparting different pitch resonances to one of the units and to connect in the circuit the means for imparting different pitch resonances to the other of the units.

20. A drive system for radio loud speaker diaphragms and the like, including two adjacent diaphragm actuating units, an electrical circuit, the system including means for imparting to each of the units a plurality of different pitch resonances, a selective switch for electrical connection with the means for imparting to each unit a plurality of different pitch resonances, the selective switch including means for selectively connecting in the circuit the means for imparting different pitch resonances to one of the units and for connecting in the circuit the means for imparting different pitch resonances to the other of the units without simultaneously breaking the circuit through the resonance pitching means of both units, and means for reversing the direction of flow of current through the resonance pitching means of one of the units.

21. A drive system for radio loud speaker diaphragms and the like, including two adjacent diaphragm actuating units, an electrical circuit, the system including means for imparting to each of the units a plurality of different pitch resonances, a selective switch for electrically connecting in the circuit the means for imparting different pitch resonances to one of the units and for electrically connecting in the circuit the means for imparting different pitch resonances to the other of the units without simultaneously breaking the circuit through the resonance pitching means of both units.

22. A drive system for radio loud speaker diaphragms and the like, including two adjacent diaphragm actuating units, an electrical circuit, the system including means for imparting to each of the units a plurality of different pitch resonances, means for electrically connecting in the circuit the means for imparting a plurality of different pitch resonances to each of the units and including means for selectively connecting in the circuit the means for imparting different pitch resonances to one of the units and for selectively connecting in the circuit the means for imparting different pitch resonances to the other of the units and for maintaining one of the different pitch resonance imparting means for one of the units in the circuit while the circuit is broken through the pitch resonance imparting means for the other unit.

23. A drive system for radio loud speakers and the like, including a plurality of adjacent pulsating current impulse responsive devices, an electrical circuit, the system including means for imparting to any of the impulse responsive devices a plurality of different pitch resonances and including means for selectively connecting in the circuit the means for imparting different pitch resonances to a part of the impulse responsive devices and for connecting in the circuit the means for imparting different pitch resonances to another part of the impulse responsive devices and for maintaining in the circuit a part of the impulse responsive devices while the circuit is broken through a part of the impulse responsive devices, and means for reversing the direction of flow of current to a part of the impulse responsive devices.

24. A drive system for radio loud speakers and the like, including a plurality of adjacent pulsating current impulse responsive devices, an electrical circuit, the system including means for imparting to any of the impulse responsive devices a plurality of different pitch resonances and including means for selectively connecting in the circuit the means for imparting different pitch resonances to a part of the impulse responsive devices and for selectively connecting in the circuit the means for imparting different pitch resonances to another part of the impulse responsive devices and for maintaining in the circuit the pitch resonance imparting means for a part of the impulse responsive devices while the circuit is broken through the pitch resonance imparting means of a part of the impulse responsive devices.

25. A drive system for radio loud speakers and the like, including a plurality of adjacent pulsating current impulse responsive devices, an electrical circuit, the system including means for imparting to one of the impulse responsive devices a plurality of different pitch resonances, and means for connecting in the circuit the means for imparting different pitch resonances to one of the impulse responsive devices with another of the impulse responsive devices.

26. A drive system for radio loud speakers and the like, including a plurality of adjacent pulsating current impulse responsive devices, an electrical circuit, the system including means for imparting to one of the plurality of responsive devices a plurality of different pitch resonances, means for connecting in the circuit the means for imparting different pitch resonances to one of the impulse responsive devices with another of the impulse responsive devices, and means in the circuit for reversing the direction of flow of pulsating current to a part of the impulse responsive devices.

27. A drive system for radio loud speakers or the like, including a pulsating current impulse responsive device, and means for selectively imparting thereto a plurality of different pitch resonances, an electrical circuit for the impulse responsive device and another pulsating current impulse responsive device in the electrical circuit and adjacent the first mentioned impulse responsive device whereby the selected pitch resonance of the first mentioned impulse responsive device and the pitch resonance of the other responsive device are composited.

28. A drive system for radio loud speakers or the like, including an electrical circuit, a plurality of pulsating current impulse responsive devices, means for selectively imparting to the plurality of pulsating current impulse responsive devices, a plurality of different pitch resonances to pitch them to the same or different pitch resonances, the impulse responsive devices being adjacent whereby their selected pitch resonances are composited.

29. A drive system for radio loud speakers or the like, including an electrical circuit, a plurality of adjacent pulsating current impulse responsive devices, means for selectively imparting to a part of the impulse responsive devices a plurality of different pitch resonances to selectively impart to said part pitch resonances different from the pitch resonance of another part of the impulse responsive devices.

30. A drive system for radio loud speakers or the like, including two adjacent pulsating current impulse responsive devices, an electrical circuit, means for selectively imparting to one of the impulse responsive devices a plurality of different pitch resonances to impart to it pitch resonances different from the pitch resonance of the other pulsating current impulse responsive device.

CHARLES HUGH DUFFY.